United States Patent

Heidingsfeld et al.

[11] Patent Number: 5,981,655
[45] Date of Patent: Nov. 9, 1999

[54] PROCESS FOR PREPARING TPU MOLDING COMPOSITIONS

[75] Inventors: Herbert Heidingsfeld, Frechen; Willi Meister, Dormagen; Bernhard Schulte, Krefeld; Wolfgang Bräuer, Leverkusen; Friedemann Müller, Neuss; Hans-Georg Hoppe, Leichlingen; Hans-Georg Wussow, Düsseldorf; Jürgen Winkler, Langenfeld, all of Germany

[73] Assignee: Bayer Aktiengesellschaft, Leverkusen, Germany

[21] Appl. No.: 09/006,064

[22] Filed: Jan. 12, 1998

Related U.S. Application Data

[62] Division of application No. 08/633,939, Apr. 17, 1996, Pat. No. 5,760,133.

[30] Foreign Application Priority Data

Apr. 24, 1995 [DE] Germany ............ 195 14 947

[51] Int. Cl.$^6$ ............ C08G 18/08; C08L 75/04
[52] U.S. Cl. ............ 525/66; 525/123; 525/294; 525/435; 525/440; 525/453; 525/467
[58] Field of Search ............ 525/66, 123, 294, 525/435, 440, 453, 467

[56] References Cited

U.S. PATENT DOCUMENTS

| | | | |
|---|---|---|---|
| 4,179,479 | 12/1979 | Carter, Jr. ............ | 525/66 |
| 4,261,946 | 4/1981 | Goyert et al. ............ | 264/211 |
| 4,317,890 | 3/1982 | Goyert et al. ............ | 525/66 |
| 4,342,847 | 8/1982 | Goyert et al. ............ | 525/66 |
| 4,452,737 | 6/1984 | Schmidt et al. ............ | 260/192 |
| 4,476,053 | 10/1984 | Schmidt et al. ............ | 260/192 |
| 5,260,375 | 11/1993 | Lausberg et al. ............ | 525/66 |
| 5,360,885 | 11/1994 | Orthmann et al. ............ | 528/49 |
| 5,731,380 | 3/1998 | Golder ............ | 525/66 |

FOREIGN PATENT DOCUMENTS

| | | |
|---|---|---|
| 1231488 | 1/1988 | Canada . |
| 418686 | 3/1991 | European Pat. Off. . |
| 4113891 | 10/1992 | Germany . |

OTHER PUBLICATIONS

Kunststoffe [Plastics] 68 (1978) (Month unavailable), pp. 819 to 825 –English Translation also attached.

Kautschuk, Gummi, Kunststoffe [Natural and Vulcanised Rubber and Plastics] 35 (1982), (Month unavailable) pp. 568 to 584.

*Primary Examiner*—James J. Seidleck
*Assistant Examiner*—Olga Asinovsky

[57] ABSTRACT

A process for the continuous production of a thermoplastic molding composition containing a mixture of a TPU and a thermoplastic (co)polymer is disclosed. The process comprises (i) introducing into an extruder via a first feed point component I) with at least 3% by weight, with respect to component I), of at least one member selected from the group consisting of components A), B) and C), and (ii) metering in the balance of said A), B) and C) into said extruder via one or more subsequent feed points, (iii) extruding components I) and II) under conditions sufficient to cause A), B) and C) reaction to form TPU, and (iv) upon the completion of said reaction, removing the resulting mixture of TPU and (co)polymer from the extruder, wherein component I) comprises 1 to 60% by weight, with respect to the total mixture, of a thermoplastic (co)polymer, and wherein component II) comprises 99 to 40% by weight, with respect to the total mixture, of the polyurethane-forming components including A) an organic diisocyanate, B) a linear polyol having terminal hydroxyl groups and a number average molecular weight of 500 to 5000, and C) a chain extender having a molecular weight of 60 to 500, and wherein the molar ratio of NCO groups in A) to the groups which react with NCO in B) and C) is in the range of 0.9 to 1.2.

2 Claims, No Drawings

PROCESS FOR PREPARING TPU MOLDING COMPOSITIONS

This application is a divisional of U.S. patent application Ser. No. 08/633,939 filed Apr. 17, 1996, which matured into U.S. Pat. No. 5,760,133, Jun. 6, 1998.

FIELD OF THE INVENTION

This invention relates to thermoplastic molding compositions which contain thermoplastic polyurethane and more particularly to a process for their preparation.

TECHNOLOGICAL BACKGROUND OF THE INVENTION

Thermoplastic polyurethane elastomers (TPUs) have long been known. They are of commercial importance due to their combination of high-grade mechanical properties with the known advantages of cost-effective thermoplastic processability. A wide range of variation in their mechanical properties can be achieved by the use of different chemical synthesis components. A review of TPUs, their properties and applications is given in Kunststoffe [*Plastics*] 68 (1978), pages 819 to 825, and in Kautschuk, Gummi, Kunststoffe [*Natural and Vulcanized Rubber and Plastics*] 35 (1982), pages 568 to 584.

TPUs are synthesized from linear polyols, mainly polyester diols or polyether diols, organic diisocyanates and short chain diols (chain extenders). Catalysts may be added to the reaction to speed up the reaction of the components.

The relative amounts of the components may be varied over a wide range of molar ratios in order to adjust the properties. Molar ratios of polyols to chain extenders from 1:1 to 1:12 have been reported. These result in products with hardness values ranging from 80 Shore A to 75 Shore D.

TPUs can either be produced in stages (prepolymer method) or by the simultaneous reaction of all the components in one step (one shot). In the former, a prepolymer formed from the polyol and diisocyanate is first formed and then reacted with the chain extender.

TPUs may be produced continuously or batch-wise. The best-known industrial production processes are the so-called belt process and the extruder process. By mixing them with other polymers, the favorable properties of TPUs can be modified. In particular, the admixture of graft rubbers improves the low temperature properties of TPUS. A TPU/ABS mixture is described in U.S. Pat. No. 4,317,890. The molding compositions obtained, however, exhibit unsatisfactory impact strength at low temperatures and are not free from segregation phenomena, the so-called "mother of pearl" effect. The use of TPUs of low density (EP-A 0,152, 049) or the addition of auxiliary processing agents (polyacrylates in U.S. Pat. No. 4,179,479, styrene-MSA copolymers in EP-A 0,443,432) does not impart a significant improvement to the compositions, which are characterized, in particular, by their modest low-temperature impact-strength.

Another route is described in DE-OS 2,854,409 (U.S. Pat. No. 4,342,847). The TPU-polymer mixtures are produced in an extruder reaction process by adding all the TPU raw materials to the pre-produced polymer, which has previously been melted in the extruder. The mixtures produced in this manner exhibit improved behavior at low temperatures. Their disadvantages, however, are the high melting temperatures required for the copolymer, which result in thermal degradation of the product, or the friction effects which occur at lower melting temperatures, which likewise result in degradation of the product. Moreover, during a continuous process at the low temperatures which are customary for a mixed phase of a TPU reaction (100° to 200° C.), extreme variations occur in the viscosity of the copolymer melt, which cause pressure fluctuations when metering in the TPU monomer. In a continuous process, this does not permit the TPU components to be metered in uniformly over an extended period, which can lead to inhomogeneities in the product or even to a stoppage of the continuous process.

Therefore, no success has hitherto been achieved in producing TPU-copolymer mixtures having good mechanical and elastic properties, particularly at low temperatures, in a continuous process over an extended period without interruptions.

DETAILED DESCRIPTION OF THE INVENTION

The present invention relates to a process for the continuous production of a thermoplastic molding composition containing a mixture of TPU and a thermoplastic (co)polymer. The process comprises (i) introducing into an extruder via a first feed point component I) with at least 3% by weight, with respect to component I), of at least one member selected from the group consisting of components A), B) and C), and (ii) metering in the balance of said A), B) and C) into said extruder via one or more subsequent feed points, (iii) extruding components I) and II) under conditions sufficient to cause A), B) and C) reaction to form TPU, and (iv) upon the completion of said reaction, removing the resulting mixture of TPU and (co)polymer from the extruder, wherein component I) comprises 1 to 60% by weight, with respect to the total mixture, of a thermoplastic (co)polymer, and wherein component II) comprises 99 to 40% by weight, with respect to the total mixture, of the polyurethane-forming components including A) an organic diisocyanate, B) a polyol having terminal hydroxyl groups and a number average molecular weight of 500 to 5000, and C) a chain extender having a molecular weight of 60 to 500, and wherein the molar ratio of NCO groups in A) to the groups which react with NCO in B) and C) is in the range of 0.9 to 1.2.

The TPU-copolymer mixtures according to the invention thus contain thermoplastically processable polyurethanes which are synthesized from organic diisocyanates, polyols and chain extenders.

Examples of suitable organic diisocyanates (A) include aliphatic, cycloaliphatic, araliphatic, heterocyclic and aromatic diisocyanates, such as those which are described in Justus Liebigs Annalen der Chemie, 562, pages 75 to 136, for example.

The following should be cited individually by way of example: aliphatic diisocyanates such as hexamethylene diisocyanate, cycloaliphatic diisocyanates such as isophorone diisocyanate, 1,4-cyclohexane diisocyanate, 1-methyl-2,4- and -2,6-cyclohexane diisocyanate and the corresponding mixtures of isomers, 4,4'-, 2,4'- and 2,2'-dicyclohexylmethane diisocyanate and the corresponding mixtures of isomers, and aromatic diisocyanates such as toluene 2,4-diisocyanate, mixtures of toluene 2,4- and 2,6-diisocyanates, 4,4', 2,4'- and 2,2'-diphenylmethane diisocyanates, mixtures of 2,4'- and 4,4'-diphenylmethane diisocyanates, urethane-modified, liquid 4,4'- and/or 2,4'- diphenylmethane diisocyanates, 4,4'-diisocyanatodiphenylethane-(1,2) and naphthalene 1,5-diisocyanate. Diisocyanates which are preferably used comprise 1,6-hexamethylene diisocyanate, isophorone diisocyanate, dicyclohexylmethane diisocyanate, mixtures of isomers of diphenylmethane diisocyanate with a 4,4'-diphenylmethane diisocyanate content greater than 96% by weight, and 4,4'-diphenylmethane diisocyanate and naphthalene 1,5-diisocyanate in particular.

Up to 15% by weight of the diisocyanates may be replaced by polyiso-cyanate; care must be taken to avoid the formation excessive crosslinking in the resulting product. Examples of such optional polyisocyanates include triphenylmethane 4,4',4"-triisocyanate and polyphenyl-polymethylene polyisocyanates.

The diisocyanates may be used individually or in the form of mixtures with each other.

Components (B) are linear polyols with terminating hydroxyl groups and a number average molecular weight of 500 to 5000. Since they may contain a small percentage of branched polyols as impurities, they are often referred to as "substantially linear" polyols. Preferred polyols (B) include polyester diols, polyether diols, polycarbonate diols or mixtures thereof.

Examples of suitable polyether diols are those prepared by the reaction of one or more alkylene oxides containing 2 to 4 carbon atoms in their alkyl radical with a starter molecule which contains two active hydrogen atoms. Examples of suitable alkylene oxides include: ethylene oxide, 1,2-propylene oxide, epichlorohydrin and 1,2- and 2,3-butylene oxide. Ethylene oxide, propylene oxide and mixtures of 1,2-propylene oxide and ethylene oxide are preferably used. The alkylene oxides may be used individually, alternately in succession, or as mixtures. Examples of suitable starter molecules include: water, amino alcohols such as N-alkyl diethanolamines, for example N-methyl diethanolamine, and diols such as ethylene glycol, 1,3-propylene glycol, 1,4-butanediol and 1,6-hexanediol. Mixtures of starter molecules may also optionally be used. Other suitable polyether diols are the polymerization products of tetrahydrofuran, which contain hydroxyl groups. The polyether diols may be used either individually or as mixtures of two or more polyether diols.

Trifunctional polyethers may also be used, in proportions of 0 to 30% by weight with respect to the bifunctional polyethers.

Examples of suitable polyester diols may be prepared, for example, from dicarboxylic acids containing 2 to 12 carbon atoms, preferably 4 to 6 carbon atoms, and polyhydric alcohols. Examples of suitable dicarboxylic acids include: aliphatic dicarboxylic acid such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures. e.g. in the form of a mixture of succinic, glutaric and adipic acids. In order to prepare the polyester diols it is possible to use the corresponding carboxylic acid derivatives instead of carboxylic acids, such as carboxylic acid esters containing 1 to 4 carbon atoms in their alcohol radical, carboxylic acid anhydrides, or carboxylic acid chlorides. Examples of polyhydric alcohols include glycols containing 2 to 10, preferably 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. The polyhydric alcohols may be used singly or as mixtures or two or more.

Esters of the carboxylic acid with the said diols are also suitable, particularly those containing 4 to 6 carbon atoms, such as 1,4-butanediol and/or 1,6-hexanediol, condensation products of ω-hydroxycarboxylic acids, for example (ω-hydroxycaproic acid, and preferably polymerization products of lactones, for example ω-caprolactones which may optionally be substituted.

Ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones are preferably used as the polyester diols.

The polyester diols have molecular weights (number average) of 500 to 5000.

Chain extenders with molecular weights of 60 to 500 include aliphatic diols containing 2 to 14 carbon atoms, such as ethanediol, 1,6-hexanediol, diethylene glycol, dipropylene glycol, and 1,4-butanediol in particular, for example. However, diesters of terephthalic acid with glycols containing 2 to 4 carbon atoms are also suitable, such as terephthalic acid-bis-ethylene glycol or -1,4-butanediol for example, or hydroxyalkyl ethers of hydroquinone, such as 1,4-di-(β-hydroxyethyl)-hydroquinone for example, or (cyclo) aliphatic diamines, such as isophorone diamine, 1,2- and 1,3-propylenediamine, N-methyl-propylenediamine- 1,3 or N,N'-dimethyl-ethylenediamine, for example, and aromatic diamines, such as toluene 2,4- and 2,6-diamines, 3,5-diethyltoluene 2,4- and/or 2,6-diamine, and primary ortho-, di-, tri- and/or tetraalkyl-substituted 4,4'-diaminodiphenylmethanes, for example. Mixtures of the aforementioned chain extenders may also be used. Optionally, triol chain extenders having a molecular weight of 60 to 500 may also be used.

Moreover, customary monofunctional compounds may also be used in small amounts, e.g., as chain terminators or demolding agents. Alcohols such as octanol and stearyl alcohol or amines such as butylamine and stearylamine may be cited as examples.

In order to prepare the TPUs, the synthesis components may be reacted, optionally in the presence of catalysts, auxiliary agents and/or additives, in amounts such that the equivalent ratio of NCO groups to the sum of the groups which react with NCO, particularly the OH groups of the low molecular weight diols/triols and polyols, is 0.9:1.0 to 1.2:1.0, preferably 0.95:1.0 to 1.10:1.0.

Suitable catalysts according to the invention include the usual tertiary amines which are known in the prior art, such as triethylamine, dimethyl-cyclohexylamine, N-methylmorpholine, N,N'-dimethyl-piperazine, 2-(dimethyl-aminoethoxy)-ethanol, diazabicyclo-(2,2,2)-octane and the like, for example, as well as organic metal compounds in particular, such as titanic acid esters, iron compounds, tin compounds e.g. tin diacetate, tin dioctoate, tin dilaurate or the dialkyltin salts of aliphatic carboxylic acids such as dibutyltin diacetate, dibutyltin dilaurate or the like. The preferred catalysts are organic metal compounds, particularly titanic acid esters and iron and/or tin compounds.

Apart from catalysts, auxiliary agents and/or additives may be incorporated in the synthesis components. Examples which should be mentioned include internal lubricants, anti-seizing agents, inhibitors, stabilizers against hydrolysis, light, heat and discoloration, flame retardants, colorants, pigments, inorganic and/or organic fillers and reinforcing agents.

Reinforcing agents include fibrous materials such as inorganic fibers which are well known in the prior art and which may optionally be sized in a manner well known in the art.

More detailed information on the aforementioned auxiliary agents and additives may be found in the technical literature, for example in the monograph "High Polymers" by J. H. Saunders and K. C. Frisch, Volume XVI, Polyurethanes, Parts 1 and 2, Interscience Publishers 1962 and 1964, respectively, or in DE-OS 2,901,774.

Various previously-produced (co)polymers I) may be used in the process according to the invention. For example, thermoplastic polyurethanes which have been produced according to the prior art may be used.

Thermoplastic copolymers which are suitable according to the invention include the known ABS plastics. These are elastic-thermoplastic two-phase plastics which are essentially synthesized from acrylonitrile (A), butadiene (B) and styrene or α-methylstyrene (S). B may be completely or partially replaced by another rubber component, e.g. by an EPDM rubber (a so-called AES polymer). These polymers contain a continuous phase comprising a thermoplastic resin (e.g. styrene/acrylonitrile copolymer, SAN) and a discontinuous rubber phase comprising small rubber particles, which are mostly present as a graft polymer of styrene and acrylonitrile on the rubber. They are produced in the known manner by emulsion, suspension, bulk and solution polymerization or by combinations of these methods (see C. H. Basdekis in "ABS Plastics", Reinhold Publishing Corporation, New York, 1964). Preferably those produced by emulsion or bulk polymerization are used.

Polymers which are also suitable as component I) include polyethylene and polypropylene, copolymers of ethylene and other olefinically unsaturated monomers, polybutene-(1), polymethylpentene, polystyrene (particularly high-impact polystyrene), polyvinyl chloride, methyl polymethacrylate, polycarbonates, polyamides, aromatic polyethers (e.g. polyphenylene oxide), polyesters of terephthalic acid and optionally isophthalic acid, and butylene glycol and/or ethylene glycol, polybutylene glycol terephthalate containing soft polyether segments, cellulose esters (e.g. cellulose acetate, propionate and acetobutyrate), styrene-butadiene (graft)-copolymers (optionally in admixture with other polymers), and also polypropylene and ethylene-propylene copolymers in admixture with EPM and/or EPDM rubbers, or ethylene/vinyl acetate copolymers. Polymers of this type are described by Vieweg et al in the Kunststoff-Handbuch [Plastics Handbook], Volumes II–VII, IX and XI, Carl-Hanser-Verlag, Munich, 1963 to 1992, and by Hansjürgen Sächtling in the "Kunststoffta-schenbuch" [Plastics Pocket Book], 21st Edition, Cad-Hanser-Verlag, Munich-Vienna, 1979.

ABS polymers which are preferred according to the invention are mixtures of a) 5 to 70% by weight of one or more graft products and
b) 95 to 30% by weight of one or more thermoplastic resins.

Graft products a) are preferably polymers which are obtained by the polymerization of graft monomers in the presence of a rubber as the graft base. The rubber content in this respect is 5 to 80% by weight and is jointly determined by the polymerization process. The rubber is present in the form of discrete particles, but forms a discontinuous phase.

Polybutadiene, butadiene/acrylonitrile and butadiene/styrene polymers, as well as butadiene-styrene block polymers, are particularly suitable as the graft base. The principal graft monomers are styrene, mixtures of styrene and acrylonitrile, preferably in a weight ratio of 90:10 to 50:50, a mixture of styrene and methyl methacrylate, preferably in a weight ratio of 5:95 to 95:5, and styrene-acrylonitrile-methyl methacrylate mixtures.

The thermoplastic resin b) forms the continuous phase (matrix), and is, for example, a polymer or copolymer of styrene, α-methylstyrene, acrylonitrile, methyl methacrylate and maleic anhydride. Polystyrene, a styrene-acrylonitrile copolymer with an acrylonitrile content of 20 to 35% by weight, and α-methylstyrene-acrylonitrile copolymers with an acrylonitrile content of 21 to 31% by weight are preferred. The weight average molecular weight of these resins is generally 50,000 to 550,000. The molecular non-uniformity, expressed as the value $(M_W/M_N)-1=U_n$, is 1.0 to 3.5.

Component a) may be used according to the invention on its own as component I).

The thermoplastic (co)polymer, component I) in accordance with the invention, is preferably employed in an amount of 1 to 60% by weight, most preferably 3 to 25% by weight, with respect to the total product of the process.

The process according to the invention is carried out as follows:

The TPU is continuously produced by the so-called extruder process, i.e. in a multi-shaft extruder, in the presence of the (co)polymer. In the course of this process the copolymer and at least one of the TPU components A) or B) or C), are metered into the extruder via a first feed point. The surface of the (co)polymer is partially dissolved, either in the organic diisocyanate or in an OH component, before the TPU reaction is initiated by the addition of the remaining monomers, individually or in pre-mixed, at subsequent feed points. The surface of the (co)polymer may also be partially dissolved in a mixture of the OH components, namely the diol and the polyol.

The (co)polymer and the chain extender C) or the diisocyanate A) or portions thereof are preferably metered into the extruder via a first feed point, and the remaining TPU components in each case are metered into one or more subsequent feed points.

In one particular embodiment, the TPU components may be metered in by a prepolymer method known in the art. In the course of this procedure the prepolymer may either be introduced batch-wise or produced continuously in part of the extruder, or may be produced in a separate prepolymer unit disposed upstream. The (co)polymer may then either be superficially dissolved in the diisocyanate-containing prepolymer with subsequent addition of the chain extender, or is metered in together with the chain extender with subsequent addition of the prepolymer.

The continuous process according to the invention may be carried out for a long period without any fluctuations, and results in homogeneous, light-colored products which exhibit good processing properties due to their outstanding melting behavior. They have good mechanical and elastic properties and a good impact strength with a high degree of rigidity, particularly at low temperatures. They are thus preferably used for the production of injection molded articles, such as moldings for automobiles and for the footwear industry, particularly ski boots, for example.

EXAMPLES

Example 1

Comparison Example not According to the Invention

The TPU/ABS mixture was prepared continuously in a Werner/Pfleiderer ZSK 120 unit. The temperatures of the 13 sections were 160° C. to 220° C. The rotational speed of the screw was set to 300 rpm.

28 parts by weight of a commercially available emulsion ABS comprising 17% acrylonitrile, 53% styrene and 30% butadiene, 102 parts by weight of diphenylmethane diisocyanate (liquid MDI, 50° C.), a mixture of 100 parts by weight of a poly-1,4-butanediol adipate with a molecular weight (number average) of about 2250, 1.0 part by weight of 2,2'-6,6'-tetraisopropyl diphenyl carbodiimide, 1.50 parts by weight of hexanediol and 10 ppm of tetrabutyl titanate, which mixture was heated to 190° C., was metered in as shown in the Table together with 31 parts by weight of butanediol. 1.5 parts by weight of bis-ethylene stearylamide were additionally metered into the first section. The total amount metered in was 1200 kg/hour.

The TPU-ABS mixture was extruded and the extrudate cooled in water and granulated.

Example 2

This example was carried out analogously to Example 1, but with the modified metering sequence given in the Table.

Example 3

This example was carried out analogously to Example 1, but with the modified metering sequence given in the Table.

The most important properties of the products produced in the examples are summarized in the following Table.

TABLE

| Ex. | Metered addition | | | | Hardness | MVR | | | TPU-ABS Impact tension (-20° C.) | Breaking | Pressure fluctuation |
| | ABS Sect. | Polyol mixture Sect. | Diol Sect. | MDI Sect. | DIN 53 505 Shore D | ISO 1133 205° C. | 205° C. | 210° C. | DIN 53 488 Elong. % | stress DIN 53 504 MPA | during addition of components |
| --- | --- | --- | --- | --- | --- | --- | --- | --- | --- | --- | --- |
| 1* | 1 | 3 | 3 | 3 | 57 | / | 12.3 | 35.7 | 64 | 63.4 | severe, process stopped after 6 hours |
| 2 | 1 | 3 | 3 | 1 | 58 | 0.6 | 15.3 | 40.9 | 62 | 62.2 | none |
| 3 | 1 | 3 | 1 | 3 | 57 | 0.7 | 16.1 | 40.0 | 56 | 62.5 | none |

Sect. = section
Diol = butanediol/hexanediol
* = comparative example

It can clearly be seen that severe pressure fluctuations occurred in the standard procedure according to DE-OS 2,854,409, in which the copolymer is only thermally melted. These pressure fluctuations resulted in a forced stoppage after 6 hours.

In contrast, in the examples according to the invention, melting and dispersion of the copolymer was facilitated by taking up the copolymer with the aid of one of the TPU monomers, so that the monomers could be metered in uniformly over a long period (>>48 hours) without any pressure fluctuations, and a homogeneous product was thus obtained.

The product produced by the process according to the invention was light-colored and exhibited lower melting temperatures. It also had very good low-temperature properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of a thermoplastic molding composition containing a mixture of thermoplastic polyurethane and a thermoplastic (co)polymer comprising (i) introducing into an extruder via a first feed point component I) with one member selected from the group consisting of components A), and C), and (ii) metering in the balance of said A), B) and C) into said extruder via one or more subsequent feed points, (iii) extruding under conditions sufficient to cause A), B) and C) reaction to form thermoplastic polyurethane, and (iv) upon the completion of said reaction, removing the resulting mixture of thermoplastic polyurethane and (co)polymer from the extruder, wherein component I) comprise 1 to 60% by weight, with respect to the total mixture, of a thermoplastic (co)polymer selected from the group consisting of polyethylene, polypropylene, copolymers of ethylene, polybutene-(1), polymethylpentene, polystyrene, polyvinyl chloride, methyl polymethacrylate, polycarbonate, polyamide, aromatic polyether, polyester of butylene glycol and/or ethylene glycol and terephthalic acid and optionally isophthalic acid, polybutylene glycol terephthalate containing soft polyether segments and cellulose esters, and wherein component II) comprise 99 to 40% by weight, with respect to the total mixture, of the polyurethane-forming components including A) an organic diisocyanate B) a linear polyol having terminal hydroxyl groups and a number average molecular weight of 500 to 5000, and C) a chain extender having a molecular weight of 60 to 500, and wherein the molar ratio of NCO groups in A) to the OH groups which react with NCO groups in B) and C) is in the range of 0.9 to 1.2.

2. The process of claim 1 wherein component I) is present in an amount of 3 to 25% by weight, with respect to the total mixture.

* * * * *